(No Model.)
F. STITZEL.
GOVERNOR FOR STEAM PUMPS.
No. 452,809. Patented May 26, 1891.
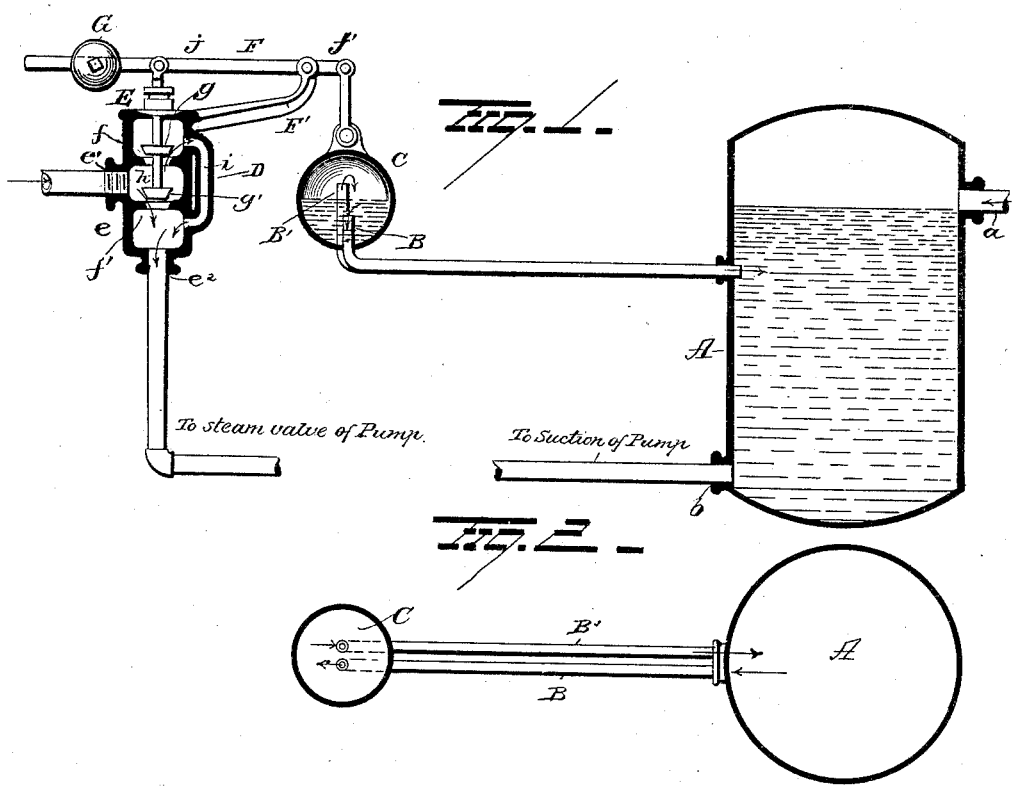
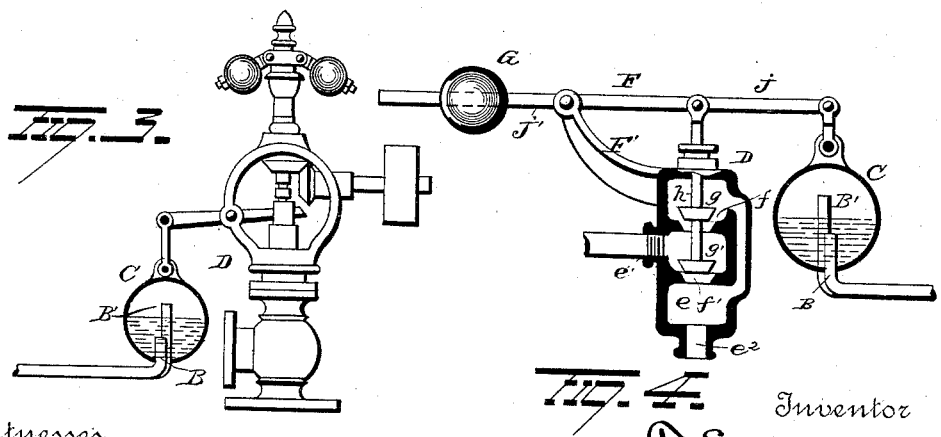
Witnesses
Inventor
F. Stitzel
By his Attorney

UNITED STATES PATENT OFFICE.

FREDERICK STITZEL, OF LOUISVILLE, KENTUCKY.

GOVERNOR FOR STEAM-PUMPS.

SPECIFICATION forming part of Letters Patent No. 452,809, dated May 26, 1891.

Application filed May 2, 1890. Serial No. 350,355. (No model.)

*To all whom it may concern:*

Be it known that I, FREDERICK STITZEL, a citizen of Louisville, in the county of Jefferson and State of Kentucky, have invented certain new and useful Improvements in Governors for Steam-Pumps; and I do hereby declare the following to be a full, clear, and exact description of the invention, such as will enable others skilled in the art to which it appertains to make and use the same.

My invention relates to an improvement in steam-pumps, and more particularly to a governor therefor, and is designed for use in connection with an absorption-machine such as used for the production of artificial cold, though it is applicable for use with steam-pumps employed in connection with other apparatus.

In the case of an absorption-machine the water saturated with gas collects in an airtight generally cylindrical vessel, and a steam-pump receives it from there and forces it into a still. Now it is important that this water should always remain at a given height in the vessel and the surplus pumped into the still as fast as it collects above a given height. In consequence of the irregularity of the returning liquid it is necessary that the speed of the pump be varied. Heretofore this variation of speed has been accomplished by means of a float in the vessel acting on the steam-valve; but this method has not proven satisfactory on account of leakage of gas at the stuffing-box when loosely compressed to allow the float to act.

It is the object of my invention to obviate the objections of previous devices and to construct a governor for steam-pumps without the use of stuffing-boxes.

A further object is to produce a governor for steam-pumps which shall be of simple construction, active and effective in operation, and not liable to get out of order.

A further object is to construct a governor for steam-pumps in such manner that it shall be adjustable.

A further object is to provide a governor for steam-pumps so constructed that the height of the liquid in a vessel may be regulated by the adjustment of the governor.

A further object is to provide an adjustable governor for steam-pumps and to so connect it with a vessel and the pump which removes liquid therefrom that the liquid in said vessel shall be maintained at a given or predetermined height, notwithstanding the irregularity of flow into and out of the vessel.

With these objects in view the invention consists in certain novel features of construction and combinations and arrangements of parts as hereinafter set forth, and pointed out in the claims.

In the accompanying drawings, Figure 1 is a sectional view of my invention. Fig. 2 is a plan view of the vessel A and receptacle C. Fig. 3 is a view illustrating my improvement applied to a ball-governor. Fig. 4 is a view of the device as applied in connection with a boiler-pump.

A represents a vessel of suitable capacity for containing a requisite amount of ammoniated water for use in the process of producing artificial cold, said vessel being provided with an inlet $a$, preferably in proximity to its upper end, and an outlet $b$ at its lower end, which latter communicates with a pump, (not shown,) by means of which the liquid in the vessel A is transferred to a still.

It is important that the flow of liquid into and out of the vessel shall at all times be maintained at a predetermined level, and to accomplish this purpose, notwithstanding the irregularities of flow of the liquid into and out of the vessel A, I provide a governor D, whereby the action of the pump will be regulated. In constructing the governor D a valve E is employed, which valve is preferably nearly balanced and may be of any approved construction. A convenient way of making this valve is as shown in the drawings, in which a cylinder $e$ is provided with an inlet-port $e'$ and an outlet-port $e^2$. Located above and below the inlet-port $e'$ are valve-seats $f f'$, having central openings adapted to be covered by disk-valves $g g'$, which latter are secured to a valve-stem $h$. A by-pass $i$ communicates with the cylinder above and below the valve-seats, so that steam admitted to the cylinder $e$ will flow through both valve-seats, as shown by arrows in the drawings. The valve-stem $h$ projects above the cylinder $e$, and at its upper end is pivotally connected with a lever F.

The lever F is pivoted at a point near one end to an arm F', projecting laterally from the cylinder of the valve E, and on the long arm j of said lever, in proximity to its free end, an adjustable weight G is located.

Pivotally connected to and suspended from the free end of the short arm j' of lever F is an air-tight receptacle C, which communicates with the vessel A in proximity to the upper end thereof by means of two flexible pipes B B', the pipe B preferably terminating in the receptacle C at a point at or near its center, and the pipe B' terminating at a point slightly above the termination of the pipe B. If desired, the lengths of the pipes B B' may be varied so long as the lever F and its attached receptacle C is permitted free vibration. The pipe B may be made to just enter the receptacle C at its lowest point and the other pipe B' project into it, but I prefer to project the shorter pipe B nearly to the center of the receptacle, because it renders the device more susceptible to the variations of lever to a given weight. By pivoting the lever near one end, attaching the valve-stem $h$ to the longer arm, and connecting the receptacle C to the smaller arm of said lever, it will be seen that a slight movement of the receptacle C will cause a perceptible change of the disks of the valve E. The weight G is adjusted on the lever F until the receptacle C is elevated or depressed until the upper end of the pipe B is in line with the portion of the vessel at which it is desired to maintain the level of the liquid. The vessel A is supplied with liquid until the level of said liquid reaches the top of the pipe B in the receptacle C. Steam is then admitted to the pump from any convenient source and made to pass through the valve E. Steam having thus been admitted to the pump, the latter will operate to transfer the liquid from the vessel A into the still. (Not shown.) Should the returning flow into the vessel A be less than the pump removes, the level in the vessel A and receptacle C will fall, and said receptacle C being thereby overbalanced by the weight G, the valve E will slightly close and the operation of the pump will be checked. Should the liquid enter faster than removed by the pump, the level of the liquid in the vessel A and receptacle C will rise, the weight G will be overbalanced, and the valve will be slightly opened, thus increasing the speed of the pump.

This device may also be applied to a ball-governor, in which case the centrifugal force of the balls will raise the receptacle C when the liquid recedes, thus closing the valve, and when the liquid increases in the receptacle C the centrifugal force of the balls will be overcome and the valve opened.

If desired, my improved governor may be applied to a steam-boiler feed-pump to maintain a constant given level in the boiler, in which case the device will be arranged as shown in Fig. 4, and so that a given level in the boiler about corresponds with the level of the water through the center of the receptacle C, as seen in Fig. 4, the functions of the receptacle C and counter-weight tending to open the valve, and the increase of water in the receptacle C overbalancing the weight and closing the valve, and vice versa.

Having fully described my invention, what I claim as new, and desire to secure by Letters Patent, is—

1. The combination, with a vessel having an inlet and outlet pipe, a receptacle, and flexible pipes leading from the vessel and passing into the bottom of the receptacle and terminating therein at different elevations, of a valve having a steam-inlet pipe and a pipe which leads to the steam-valve of the pump, and a lever connected with the valve and reservoir, substantially as set forth.

2. The combination, with a vessel having an inlet and outlet pipe at or near its upper and lower ends, respectively, a receptacle and flexible pipes leading from the vessel at a point between the inlet and outlet pipes and passing into the lower end of the receptacle and terminating at different heights therein, of a valve having inlet-pipe and pipe leading to the steam-valve of a pump, a lever pivotally connected with the valve and with the reservoir, and an adjustable weight on said lever, substantially as set forth.

In testimony whereof I have signed this specification in the presence of two subscribing witnesses.

FREDERICK STITZEL.

Witnesses:
H. L. KUEGER,
J. H. EGERHOFF.